(12) United States Patent
Braunreiter et al.

(10) Patent No.: US 11,567,341 B2
(45) Date of Patent: Jan. 31, 2023

(54) SYSTEM AND METHOD FOR CORRECTING FOR ATMOSPHERIC JITTER AND HIGH ENERGY LASER BROADBAND INTERFERENCE USING FAST STEERING MIRRORS

(71) Applicant: Raytheon Company, Waltham, MA (US)

(72) Inventors: Dennis Braunreiter, San Diego, CA (US); Aaron Stonely, McKinney, TX (US); Daniel Young, Allen, TX (US)

(73) Assignee: Raytheon Company, Waltham, MA (US)

( * ) Notice: Subject to any disclaimer, the term of this patent is extended or adjusted under 35 U.S.C. 154(b) by 741 days.

(21) Appl. No.: 16/559,136

(22) Filed: Sep. 3, 2019

(65) Prior Publication Data

US 2021/0063764 A1    Mar. 4, 2021

(51) Int. Cl.
*G02B 27/64* (2006.01)
*G01S 17/90* (2020.01)
(Continued)

(52) U.S. Cl.
CPC ............ *G02B 27/648* (2013.01); *G01S 17/90* (2020.01); *G02B 26/0816* (2013.01); *H04B 10/1125* (2013.01)

(58) Field of Classification Search
CPC ........ G01S 17/90; G01S 17/894; G01S 17/89; G02B 23/0816; G02B 27/648; H04B 10/1125
See application file for complete search history.

(56) References Cited

U.S. PATENT DOCUMENTS 5,557,347 A    9/1996  Johnson
5,780,839 A    7/1998  Livingston
(Continued)

FOREIGN PATENT DOCUMENTS

EP    2793191 A2    10/2014
JP    3041283 B2     5/2000
JP    2002051347 A   2/2002

OTHER PUBLICATIONS

Higgs et al., "Atmospheric Compensation and Tracking Using Active Illumination," Lincoln Laboratory Journal, vol. 11, Nov. 1998, 22 pages.
(Continued)

*Primary Examiner* — Thomas A Hollweg
*Assistant Examiner* — Mary A El-Shammaa

(57) ABSTRACT

A system includes a high energy laser (HEL) configured to transmit a HEL beam aimed at a first location on an airborne target. The system also includes a beacon illuminator laser (BIL) configured to transmit a BIL beam aimed at a second location on the target, wherein the second location is offset from the first location. The system also includes at least one fast steering mirror (FSM) configured to steer the BIL beam to be spatially and angularly offset from the HEL beam. The system also includes at least one Coudé path FSM configured to simultaneously receive both the HEL beam and the BIL beam and steer the HEL beam and the BIL beam to correct for atmospheric jitter of the HEL beam and the BIL beam while maintaining the offset of the BIL beam from the HEL beam.

22 Claims, 4 Drawing Sheets

(51) Int. Cl.
  *G02B 26/08* (2006.01)
  *H04B 10/112* (2013.01)

(56) References Cited

U.S. PATENT DOCUMENTS

| | | | |
|---|---|---|---|
| 5,936,229 | A | 8/1999 | Livingston |
| 6,115,123 | A | 9/2000 | Stappaerts et al. |
| 7,041,953 | B2 | 5/2006 | Byren |
| 8,049,870 | B2 | 11/2011 | Mosier et al. |
| 8,218,589 | B1 * | 7/2012 | Saunders ............... G01S 17/66 |
| | | | 372/33 |
| 8,415,600 | B2 | 4/2013 | Hutchin |
| 8,853,604 | B1 | 10/2014 | Barchers |
| 9,368,936 | B1 | 6/2016 | Lenius et al. |
| 10,113,908 | B1 * | 10/2018 | Marx ....................... G01J 3/04 |
| 10,565,684 | B2 | 2/2020 | Zhang et al. |
| 10,798,298 | B1 | 10/2020 | Tarifa |
| 11,017,560 | B1 | 5/2021 | Gafni et al. |
| 2006/0022115 | A1 | 2/2006 | Byren |
| 2006/0126952 | A1 | 6/2006 | Suzuki et al. |
| 2007/0217705 | A1 | 9/2007 | Lee et al. |
| 2009/0092337 | A1 | 4/2009 | Nagumo |
| 2012/0268309 | A1 | 10/2012 | Samuel et al. |
| 2012/0297969 | A1 * | 11/2012 | King ....................... F41A 23/20 |
| | | | 250/203.2 |
| 2013/0010100 | A1 | 1/2013 | Kotaki et al. |
| 2016/0086018 | A1 | 3/2016 | Lemoff |
| 2016/0184924 | A1 | 6/2016 | Kalender et al. |
| 2016/0247262 | A1 | 8/2016 | Li et al. |
| 2016/0295208 | A1 | 10/2016 | Beall |
| 2017/0192094 | A1 | 7/2017 | Marron et al. |
| 2017/0261743 | A1 | 9/2017 | Kim et al. |
| 2017/0358095 | A1 | 12/2017 | Levy |
| 2018/0307815 | A1 | 10/2018 | Samadani et al. |
| 2021/0156969 | A1 | 5/2021 | Levy et al. |

OTHER PUBLICATIONS

Chen et al., "Advanced image registration techniques and applications," Proceedings of SPIE, SPIE Defense and Security Symposium, Apr. 2008, 15 pages.
Chen et al., "Advanced super-resolution image enhancement process," Proceedings of SPIE, Optical Engineering + Applications, Sep. 2008, 11 pages.
Braunreiter et al., U.S. Appl. No. 16/596,595 entitled "System and Method for Predictive Compensation of Uplink Laser Beam Atmospheric Jitter for High Energy Laser Weapon Systems" filed Oct. 8, 2019, 27 pages.
Braunreiter et al., U.S. Appl. No. 16/674,995 entitled "Atmospheric Jitter Correction and Target Tracking Using Single Imaging Sensor in High-Energy Laser Systems" filed Nov. 5, 2019, 51 pages.
International Search Report dated Apr. 1, 2021 in connection with International Patent Application No. PCT/US2020/040571, 3 pages.
Written Opinion of the International Searching Authority dated Apr. 1, 2021 in connection with International Patent Application No. PCT/US2020/040571, 7 pages.
International Search Report dated Mar. 19, 2021 in connection with International Patent Application No. PCT/US2020/036675, 3 pages.
Written Opinion of the International Searching Authority dated Mar. 19, 2021 in connection with International Patent Application No. PCT/US2020/036675, 8 pages.
Office Action dated Aug. 6, 2021 in connection with U.S. Appl. No. 16/596,595, 32 pages.
Office Action dated Aug. 18, 2021 in connection with U.S. Appl. No. 16/702,279, 32 pages.
Office Action dated Jul. 1, 2021 in connection with U.S. Appl. No. 16/674,995, 14 pages.
International Search Report and Written Opinion of the International Searching Authority in connection with International Patent Application No. PCT/US2020/029619 dated Jul. 10, 2020, 8 pages.
International Search Report and Written Opinion of the International Searching Authority in connection with International Patent Application No. PCT/US2020/033176 dated Jul. 15, 2020, 10 pages.
Skaloud et al., "Rigorous approach to bore-sight self-calibration in airborne laser scanning", International Society for Photogrammetry and Remote Sensing, Inc., Sep. 2006, 13 pages.
Office Action dated Nov. 30, 2021 in connection with U.S. Appl. No. 16/674,995, 16 pages.
Office Action dated Dec. 7, 2021 in connection with U.S. Appl. No. 16/596,595, 37 pages.
Office Action dated Jan. 19, 2022 in connection with U.S. Appl. No. 16/702,279, 23 pages.
Advisory Action dated Feb. 11, 2022 in connection with U.S. Appl. No. 16/674,995, 6 pages.
Applicant-Initiated Interview Summary dated Feb. 15, 222 in connection with U.S. Appl. No. 16/702,279, 3 pages.
Braunreiter et al., U.S. Appl. No. 16/702,279 entitled "Super-Resolution Automatic Target Aimpoint Recognition and Tracking" filed Dec. 3, 2019, 51 pages.
Notice of Allowance dated Jul. 20, 2022 in connection with U.S. Appl. No. 16/674,995, 9 pages.
Notice of Allowance dated Aug. 8, 2022 in connection with U.S. Appl. No. 16/596,595, 3 pages.
Non-Final Office Action dated Sep. 9, 2022 in connection with U.S. Appl. No. 16/702,279, 19 pages.

* cited by examiner

SYSTEM AND METHOD FOR CORRECTING FOR ATMOSPHERIC JITTER AND HIGH ENERGY LASER BROADBAND INTERFERENCE USING FAST STEERING MIRRORS

GOVERNMENT RIGHTS

This invention was made with U.S. government support under contract number W9113M-17-D-0006-0002 awarded by the Department of Defense. The U.S. government may have certain rights in this invention.

TECHNICAL FIELD

This disclosure is directed in general to laser pointing correction. More specifically, this disclosure relates to a system and method for correcting for atmospheric jitter and high energy laser broadband interference in laser beam pointing systems using fast steering mirrors. Here, laser beam pointing systems can include high-energy laser weapons, laser communications, beacons for laser guided weapons, laser imaging systems, and any other system application that requires a laser beam to propagate through the atmosphere, where the observed laser return motion for atmospheric compensation on the downlink is different than the laser disturbance on transmission or uplink

BACKGROUND

For high energy laser (HEL) tactical ground-to-air engagements with elevation angles greater than the horizon, HEL beam quality loss from atmospheric disturbances on the laser beam propagation is due to atmospherically induced beam tip-tilt or jitter, in addition to optical transmission losses. Uncompensated HEL beam jitter decreases the HEL power on the intended target, which increases target kill times and reduces target kill probability. Compensation for the atmospheric jitter of the HEL is important to maximizing HEL power-on-target. Similarly, for any laser beam pointing systems, such as laser communications, compensating for atmospheric jitter of the laser beam maximizes signal-to-noise-ratios, as in communications and laser imaging and laser spot location for remote imaging and laser weapon guidance.

SUMMARY

This disclosure provides a system and method for correcting for atmospheric jitter and high energy laser broadband interference for high energy weapon systems and any other system that requires a laser beam to be pointed accurately in the atmosphere at a target or object.

In a first embodiment, a system includes a high energy laser (HEL) configured to transmit a HEL beam aimed at a first location on an airborne target or sensor. The system also includes a beacon illuminator laser (BIL) configured to transmit a BIL beam aimed at a second location on the target, wherein the second location is offset from the first location. The system also includes at least one fast steering mirror (FSM) configured to steer the BIL beam to be spatially and angularly offset from the HEL beam. The system also includes at least one Coudé path FSM configured to simultaneously receive both the HEL beam and the BIL beam and steer the HEL beam and the BIL beam in the same manner to correct for atmospheric jitter of the HEL beam and the BIL beam while maintaining the offset of the BIL beam from the HEL beam.

In a second embodiment, a jitter correction system includes at least one FSM configured to receive a BIL beam transmitted by a BIL and steer the BIL beam to be spatially and angularly offset from a HEL beam transmitted by a HEL, wherein the HEL beam is aimed a first location on an airborne target, the BIL beam is aimed at a second location on the target, and the second location is offset from the first location. The jitter correction system also includes at least one Coudé path FSM configured to simultaneously receive both the HEL beam and the BIL beam and steer the HEL beam and the BIL beam to correct for atmospheric jitter of the HEL beam and the BIL beam while maintaining the offset of the BIL beam from the HEL beam.

In a third embodiment, a method includes transmitting, by a HEL, a HEL beam aimed at a first location on an airborne target. The method also includes transmitting, by a BIL, a BIL beam aimed at a second location on the target, wherein the second location is offset from the first location. The method also includes steering, by at least one FSM, the BIL beam to be spatially and angularly offset from the HEL beam. The method also includes simultaneously receiving, at least one Coudé path FSM, both the HEL beam and the BIL beam and steering the HEL beam and the BIL beam to correct for atmospheric jitter of the HEL beam and the BIL beam while maintaining the offset of the BIL beam from the HEL beam.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures described below and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

Figure 1:
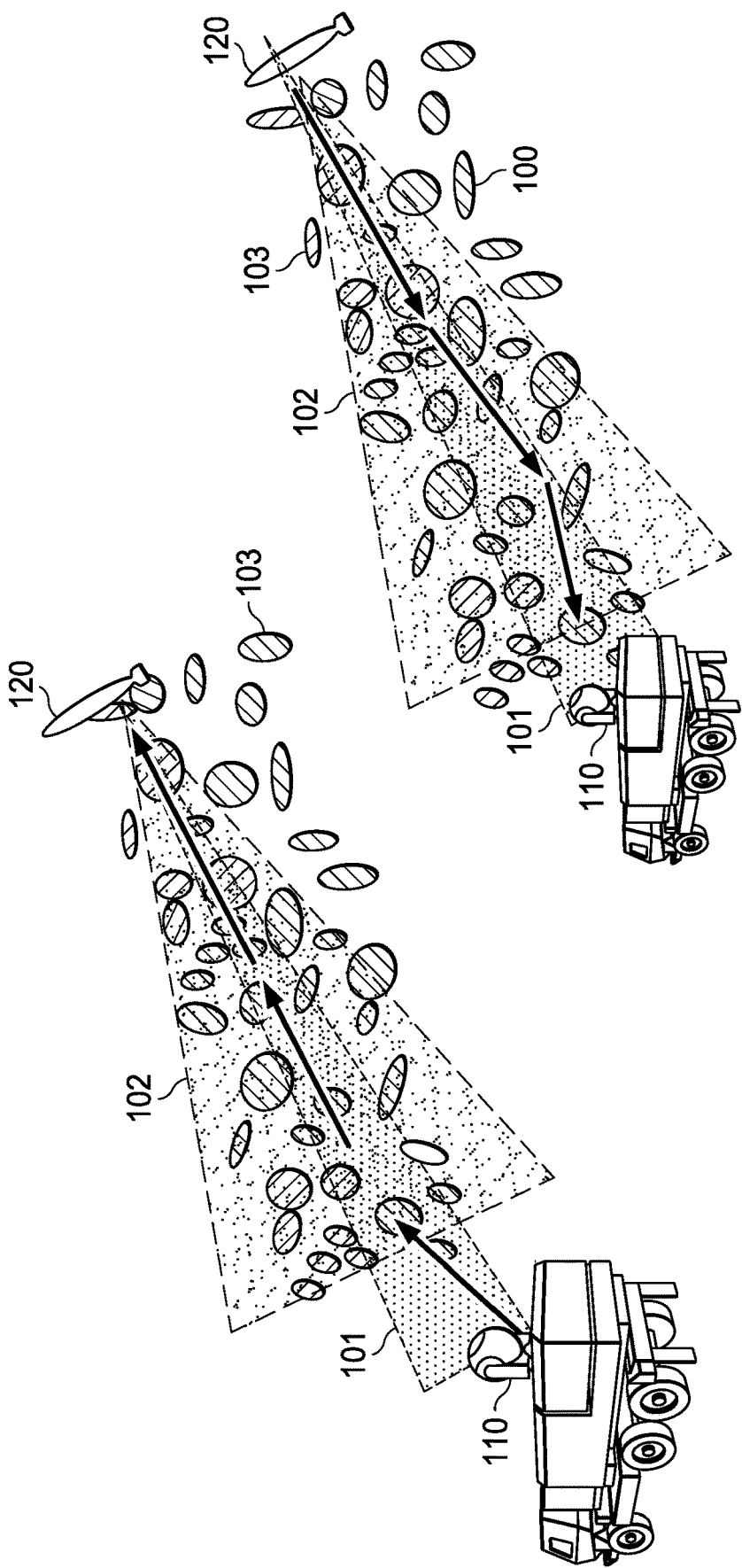
FIG. 1 illustrates examples of different kinds of atmospheric jitter.

As discussed above, compensation for atmospherically induced jitter in high energy laser (HEL) systems is critical to maximizing HEL power-on-target. Atmospheric jitter includes both downlink jitter and uplink jitter. FIG. 1 illustrates examples of both kinds of atmospheric jitter. As shown in FIG. 1, a focusing Gaussian HEL uplink beam 101 is transmitted from a laser source 110 to a target 120. The diffuse surface of the target 120 spreads the beam 101, which results in a diverging downlink beam 102, which is a spherical wave or plane wave. Both the uplink beam 101 and the downlink beam 102 pass through cells 103 of optical turbulence, which act as small lenses that distort the beams 101-102.

As indicated by the arrows of the beam paths, the uplink beam 101 and the downlink beam 102 interact with different cells 103 of optical turbulence. Thus, the resulting jitter is different on the uplink than on the downlink. Typically, the uplink HEL beam jitter is the dominant atmospheric jitter effect contributing to atmospheric induced loss of power on target. For tactical ranges, the uplink jitter is different than the downlink jitter as seen by traditional tracking systems, since the uplink beam 101 is a focusing Gaussian beam, and the downlink beam 102 is a spherical wave or plane wave.

The optical turbulence in the atmosphere degrades the effect of the HEL beam 101 by distorting its wavefront profile, which in effect reduces the focused power on target. Target dynamics also introduce tracking errors in HEL beam pointing. The wavefront errors introduced by optical turbulence are composed of multiple orders. The primary wavefront distortions are tip-tilt of beam jitter, and the other wavefront errors can be grouped in a category of higher order terms. As discussed above, the jitter of the beam 101 going up in the atmosphere is different than the jitter of the downlink beam 102. In addition, as the target 120 heats up from the HEL beam 101, significant disturbances from broadband interference from the generated heat interferes with tracking and atmospheric correction systems, thereby causing dropped track.

Different compensation systems are sometimes used to address at least some portion of optically induced atmospheric wavefront error. One system is a target illumination laser (TIL) and imaging tracker with a fast steering mirror (FSM) for tip-tilt correction. Another system is a wavefront sensor and deformable mirror for higher order wavefront correction. The TIL approach to compensation is a more basic form of atmospheric jitter correction, while the deformable mirror with adaptive optics (AO) compensation is employed on more advanced HEL systems. The TIL is used to illuminate the target in the short wave infrared (SWIR) band at an offset optical frequency for jitter correction, since looking at any return from the HEL beam will quickly saturate an optical receiver. The received target return (downlink) from the TIL illumination is imaged by a SWIR camera that is aligned optically with the HEL beam. The jitter in the image seen in the TIL SWIR image is the downlink jitter from the atmosphere, target dynamics, and any residual opto-mechanical jitter. The jitter in the SWIR image is estimated with an imaging tracker that estimates the target position error on each frame relative to boresight as well as the targets aimpoint. The error estimates are then provided to a FSM that applies an opposite command of the HEL of the estimated boresight error from jitter.

In some systems, the beacon illuminator laser (BIL) transmits using a separate optically aligned transmitting aperture from the HEL beam. Use of a separate transmitting aperture for the BIL introduces errors in estimation of atmospherics since the BIL angle to the target is slightly different from the HEL angle to the target and goes through different atmospheric paths. These errors reduce the effectiveness of any correction applied to the HEL beam at the target.

To address these issues, the embodiments described in this disclosure provide a system and method for correcting for atmospheric jitter and HEL broadband interference. The disclosed embodiments provide for accurate compensation of atmospherically induced jitter of a HEL beam on the target. The disclosed embodiments include multiple optical elements controlled by a track and atmospheric compensation algorithms that spatially offset the BIL beam from the HEL beam and perform tip-tilt correction of the HEL beam uplink jitter. By offsetting the BIL beam, the disclosed embodiments provide for a correction of the atmospheric errors while maintaining track in the presence of the HEL beam interference over the course of the engagement.

It will be understood that embodiments of this disclosure may include any one, more than one, or all of the features described here. Also, embodiments of this disclosure may additionally or alternatively include other features not listed here. While the disclosed embodiments may be described with respect to laser systems in military applications, these embodiments are also applicable in any other suitable systems or applications.

Figure 2:
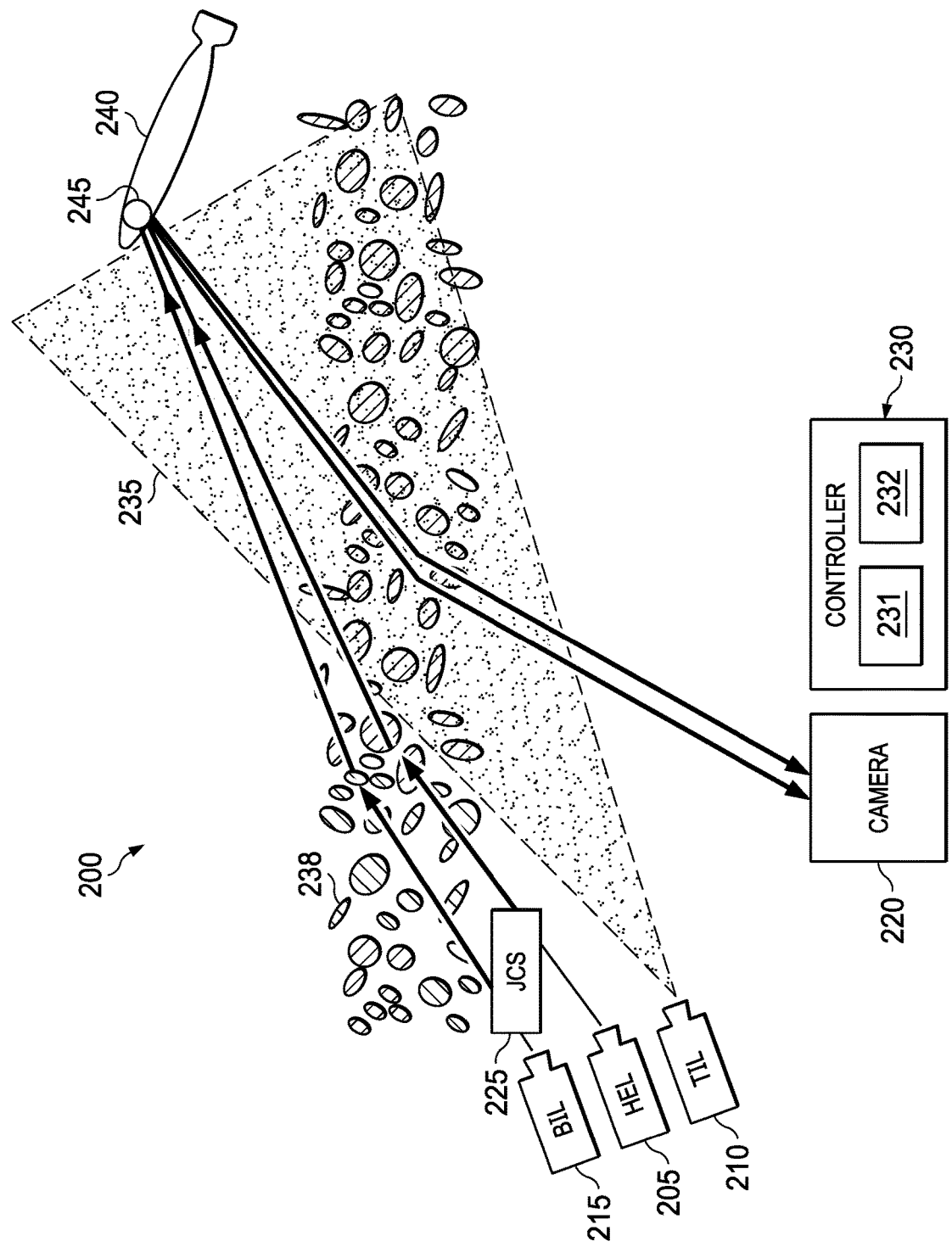
FIG. 2 illustrates an example system for correcting for atmospheric jitter and high energy laser broadband interference according to this disclosure.

FIG. 2 illustrates an example system 200 for correcting for atmospheric jitter and high energy laser broadband interference according to this disclosure. As shown in FIG. 2, the system 200 includes a HEL 205, a TIL 210, a BIL 215, a camera 220, a jitter correction system 225, and a controller 230.

The HEL 205 is configured to generate a high energy laser beam that is aimed toward a particular location on a target 240. The TIL 210 is configured to illuminate the target 240 with an illumination beam 235, and can be used to measure the distance and angle of the target 240 relative to the HEL 205. In some embodiments, the TIL 210 generates an illumination light at a wavelength of approximately 1575 nm. However, this wavelength is merely one example, and in other embodiments, the illumination light could be at a longer or shorter wavelength.

The BIL 215 is configured to generate a more focused illumination spot 245 on the target 240. A particular intended location on the target 240 is selected to be illuminated by the BIL spot 245. For example, it may be predetermined to illuminate a particular feature on the nose of the target 240, and to offset the position of the BIL beam and the HEL beam to avoid broadband interference from the HEL heating of the target. As shown in FIG. 2, the BIL spot 245 is subject to optical turbulence 238 in the atmosphere, which results in uplink jitter of the BIL spot 245. The actual location of the BIL spot 245 on the target 240 relative to the intended or expected location of the BIL spot 245 on the target 240 is used to determine the uplink jitter. In some embodiments, the BIL spot 245 is at a wavelength of approximately 1005 nm. However, this wavelength is merely one example, and in other embodiments, the BIL spot 245 could be at a longer or shorter wavelength. The wavelength of the BIL spot 245 is close to the wavelength of the HEL 205; thus, the two experience approximately the same uplink jitter.

The camera 220 is a high-speed SWIR camera co-boresighted with the HEL 205. The camera 220 is configured to receive and process images from the target 240. In particular, the camera 220 receives images that illustrate motion of the BIL spot 245 caused by atmospheric jitter. In some embodiments, one camera 220 is used for both TIL tracking of the target 240 and tracking of the BIL spot 245. In other embodiments, these functions can be performed by separate cameras 220.

The jitter correction system 225 is disposed in the optical path of the HEL 205 and the BIL 215, and includes multiple optical elements configured to spatially offset the BIL beam from the HEL beam and control atmospheric jitter of both beams. The jitter correction system 225 operates to ensure that both beams reach the target 240 in the right location and are spatial offset from each other so that the two beams can be distinguished in the return signal, and so that the broadband interference generated by the HEL beam on the target is spatially separated from the return of the BIL. Thus, the jitter correction system 225 allows precise, independent pointing of multiple beams. Further details regarding the jitter correction system 225 are provided below with respect to FIG. 3.

The controller 230 performs multiple algorithms and control operations to correct atmospheric jitter and compensate for HEL broadband interference. The controller 230 can be programmable, and can include any suitable combination of hardware, firmware, and software for image tracking and control of other components, including the jitter correction system 225. For example, the controller 230 could denote at least one processor 231 configured to execute instructions obtained from at least one memory 232. The controller 230 may include any suitable number(s) and type(s) of processors or other computing or control devices in any suitable arrangement. Example types of controllers 230 include microprocessors, microcontrollers, digital signal processors, field programmable gate arrays, application specific integrated circuits, and discrete circuitry. In some embodiments, the operations of the controller 230 described herein may be divided and performed by two or more separate controllers 230.

Figure 3:
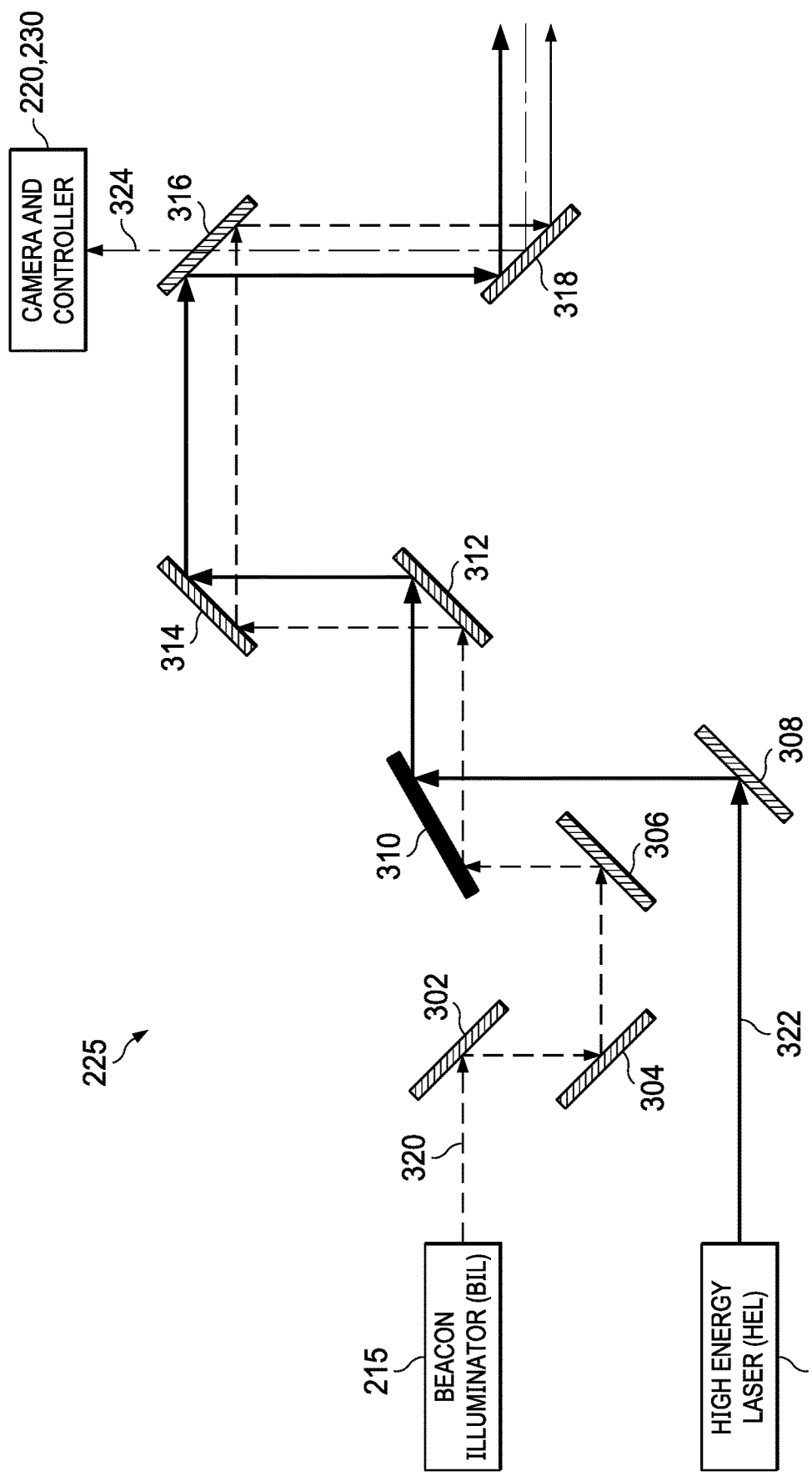
FIG. 3 illustrates additional details of a jitter correction system shown in FIG. 2 according to this disclosure.

FIG. 3 illustrates additional details of the jitter correction system 225 according to this disclosure. As shown in FIG. 3, the jitter correction system 225 includes a pair of FSMs 302-304, a first fold mirror 306, a second fold mirror 308, a deformable mirror 310 for wavefront correction, a pair of Coudé path FSMs 312-314, an aperture sharing element 316, and a high speed mirror 318.

As discussed above, the BIL 215 transmits a BIL beam 320, and the HEL 205 transmits a HEL beam 322. Both beams 320-322 are aimed at the target 240, but at slightly different locations on the target 240. The BIL beam 320 results in the BIL spot 245 when it hits the target 240, as discussed with respect to FIG. 2.

The FSMs 302-304 receive the BIL beam 320 but do not receive the HEL beam 322. The FSMs 302-304 are controllable by the controller 230 and can be controlled to move in order to steer the BIL beam 320 in a direction independent of the HEL beam 322. In particular, the FSMs 302-304 operate to steer the BIL beam 320 to be offset spatially and pointed angularly with respect to the HEL beam 322. While the FSMs 302-304 cause the BIL beam 320 to be spatially and angularly offset from the HEL beam 322, other components of the jitter correction system 225 keep the two beams 320-322 dynamically aligned, as discussed below.

The FSMs 302-304 operate in conjunction with a tracker algorithm that estimates optimal positioning of the BIL beam 320 from the TIL return. The estimate is used by the controller 230 to control the FSMs 302-304 to adjust the alignment of the BIL beam 320. The optimal position of the BIL beam 320 is slightly offset from the HEL beam 322, so that the BIL beam 320 illuminates a similar portion of the target 240, but not exactly the same portion of the target 240 that the HEL beam 322 contacts (e.g., an offset of approximately six inches on some targets). Another reason for maintaining the BIL beam 320 offset from the HEL beam 322 is so that thermal interference from the heating of the target 240 is spatially separated from a BIL target return spot 324 in the camera 220. The separation of the BIL target return spot 324 from the broadband thermal interference enables the ability to perform atmospheric compensation throughout the target engagement and illuminates target aimpoint features used to maintain the HEL beam aimpoint.

The fold mirrors 306-308 are separate mirrors having a similar function. The fold mirror 306 receives the BIL beam 320, and the fold mirror 308 receives the HEL beam 322. The fold mirrors 306-308 simply direct the beams 320-322 to the deformable mirror 310 without substantially changing any properties of the beams 320-322. In contrast to the FSMs 302-304, which are capable of changing orientation, the fold mirrors 306-308 are static mirrors. The fold mirrors 306-308 are representative of a beam control layout. In some embodiments, the fold mirrors 306-308 may be optional or their function may be implemented using other optical components.

The deformable mirror 310 receives the beams 320-322 and corrects for atmospheric wavefront errors sensed by an optional wavefront sensor (not shown). The deformable mirror 310 includes multiple actuators that move to control the shape of the surface of the deformable mirror 310. In some embodiments, the actuators are controlled by the controller 230 based on sensor information received by the wavefront sensor. During operation of the system 200, the beams 320-322 are subject to deformation. As the whole system heats up, vibrates, and flexes, the beams 320-322 are likely to deform. By changing the shape of its mirror surface, the deformable mirror 310 can correct the deformation of the beams 320-322. In some embodiments, the deformable mirror 310 is optional in the jitter correction system 225.

The Coudé path FSMs 312-314 simultaneously receive the HEL beam 322 and the BIL beam 320 from the deformable mirror 310. The FSMs 312-314 operate to overcome atmospheric jitter to keep both beams 320-322 still (or substantially still) on the target 240. The Coudé path FSMs 312-314 keep the HEL beam 322 and the BIL beam 320 aligned through the optical assembly, while stabilizing the BIL beam 320 from atmospheric disturbances estimated from the BIL return and processed in the camera 220 and controller 230, and while allowing separate control of the beams 320-322 based on return images received by the camera 220. The Coudé path FSMs 312-214 simultaneously steer both beams 320-322 the same amount. However, because the BIL beam 320 is steered slightly by the FSMs 302-304 upfront, the Coudé path FSMs 312-314 allow the BIL beam 320 and the HEL beam 322 to be pointed in slightly different directions, thereby maintaining the offset at the target 240. The Coudé path FSMs 312-314 provide an independent atmospheric correction to the HEL beam 322 and the BIL beam 320 through the BIL spot that is not provided by the high speed mirror 318. The high speed mirror 318 only corrects for atmospheric jitter as seen by the TIL 210 and TIL return processed by the camera 220 and the controller 230, that is separated from the BIL return in time.

In one aspect of operation, the BIL target return spot 324 reflects off the target 240 and is returned to the camera 220. The BIL target return spot 324 moves with the atmospherically introduced uplink jitter and is distorted from atmospheric wavefront errors. A control algorithm executed by the controller 230 estimates the uplink jitter from the BIL target return spot 324 seen on the camera image and determines corrections needed to compensate for the jitter. The corrections are implemented by movement of one or more of the Coudé path FSMs 312-314 under control of the controller 230. The movement of the Coudé path FSMs 312-314 to compensate for the uplink jitter of the beams 320-322 can introduce artificial motion into the line of sight correction performed by the TIL FSM (not shown), and can be corrected with image processing to stabilize the TIL image prior to track processing.

The aperture sharing element 316 is a beam splitter that reflects the beams 320-322 to the high speed mirror 318 while allowing the BIL target return spot 324 to pass through to the camera 220, and the resulting image is processed by the controller 230. The aperture sharing element 316 could have any suitable structure configured to allow some beams to reflect while allowing other beams to transmit.

The high speed mirror 318 is a fine track mirror that receives the beams 320-322 and reflects the beams 320-322 for transmission to the target 240. The high speed mirror 318 also receives and stabilizes the BIL target return spot 324. The BIL target return spot 324 is also stabilized through the Coudé path FSMs 312-314, in addition to the stabilization provided by the high speed mirror 318. The Coudé path FSMs 312-314 provide residual uplink correction and opto-mechanical correction after the correction from the high speed mirror 318 is applied. The Coudé path FSMs 312-314 provide correction based on the difference between the uplink jitter and the downlink jitter, while the high speed mirror 318 only provides downlink atmospheric correction.

The controller 230 operates to ensure that both beams 320-322 are pointed at the light of sight of interest, that the BIL beam 320 is offset from the HEL beam 322, and that both beams 320-322 are maintained at the desired location on the target 240. The controller 230 performs these functions by controlling movement of the FSMs 302-304 and the Coudé path FSMs 312-314 based on return images received at the camera 220. In particular, based on images received at the camera 220, the controller 230 controls operation of the FSMs 302-304 to adjust the offset of the BIL beam 320 from the HEL beam 322, in order to maintain a constant offset. In addition, the controller 230 controls operations of the Coudé path FSMs 312-314 to reduce or eliminate movement of the beams 320-322 on the target 240 due to atmospheric jitter.

In theory, it would be possible to have two or more FSMs point the HEL beam and two or more different FSMs separately point the BIL beam. However, in such a system, there would be more elements to correlate to keep the HEL beam and the BIL beam together. Each set of mirrors would result in a different error or different uncertainty, thus making correlation much more difficult in a dynamic environment. In the jitter correction system 225, because the Coudé path FSMs 312-314 are common for the two beams, any errors or uncertainty caused by the Coudé path FSMs 312-314 would be the same for the BIL beam 320 and the HEL beam 322, and thus would be easier to address and correct.

Although FIGS. 2 and 3 illustrate one example system 200 for correcting for atmospheric jitter and high energy laser broadband interference according to this disclosure, various changes may be made to FIGS. 2 and 3. In general, the makeup and arrangement of the system 200 are for illustration only. Components could be added, omitted, combined, or placed in any other configuration according to particular needs. For example, while the jitter correction system 225 includes two FSMs for BIL beam offset and two Coudé path FSMs for jitter control, this is merely one example. Other embodiments could include more or fewer FSMs for BIL beam offset and more or fewer Coudé path FSMs for jitter control.

Figure 4:
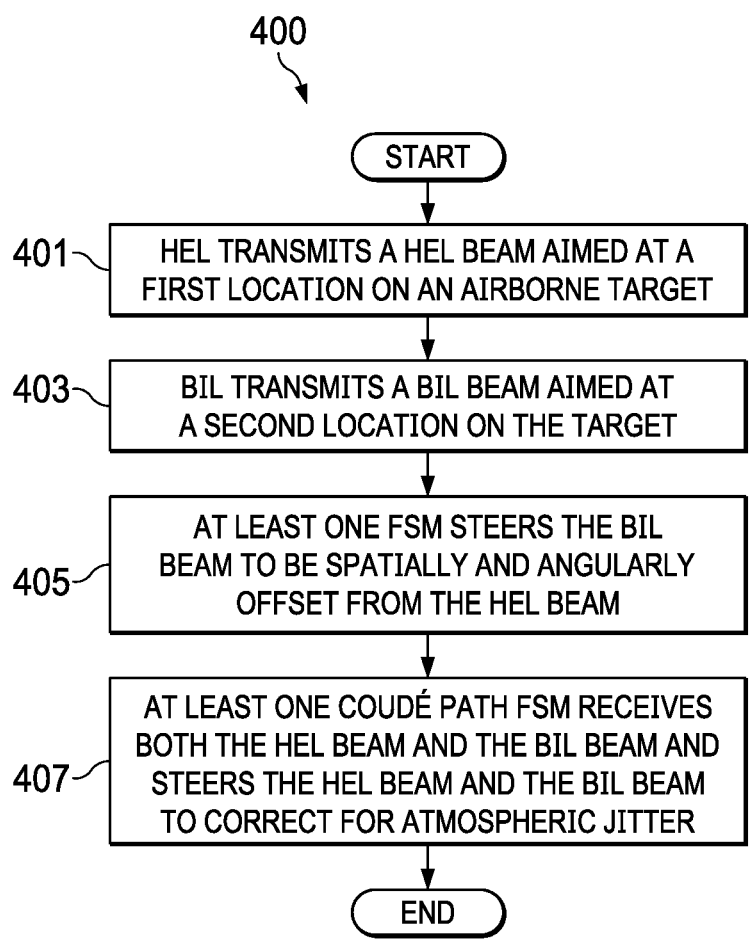
FIG. 4 illustrates an example method for correcting for atmospheric jitter and high energy laser broadband interference according to this disclosure.

FIG. 4 illustrates an example method 400 for correcting for atmospheric jitter and high energy laser broadband interference according to this disclosure. For ease of explanation, the method 400 is described as being performed using the system 200 of FIGS. 2 and 3. However, the method 400 could be used with any other suitable device or system.

At step 401, a HEL transmits a HEL beam aimed at a first location on an airborne target. This may include, for example, the HEL 205 transmitting the HEL beam 322 toward the target 240.

At step 403, a BIL transmits a BIL beam aimed at a second location on the target, where the second location is offset from the first location. This may include, for example, the BIL 215 transmitting the BIL beam 320 toward the BIL spot 245 on the target 240.

At step 405, at least one FSM steers the BIL beam to be spatially and angularly offset from the HEL beam. This may include, for example, the FSMs 302-304 steering the BIL beam 320. This may also include the controller 230 controlling movement of the FSMs 302-204 to adjust the offset of the BIL beam 320 based on the BIL target return spot 324 received at the camera 220 and resulting images processed by the controller 230.

At step 407, at least one Coudé path FSM simultaneously receives both the HEL beam and the BIL beam and steers the HEL beam and the BIL beam to correct for atmospheric jitter of the HEL beam and the BIL beam while maintaining the offset of the BIL beam from the HEL beam. This may include, for example, the Coudé path FSMs 312-314 steering the HEL beam 322 and the BIL beam 320. This may also include the controller 230 controlling movement of the Coudé path FSMs 312-314 to correct for the atmospheric jitter, based on the BIL target return spot 324 received at the camera 220 and resulting images processed by the controller 230. The Coudé path FSMs 312-314 may provide correction based on the difference between the uplink jitter and the downlink jitter.

Although FIG. 4 illustrates one example of a method 400 for correcting for atmospheric jitter and high energy laser broadband interference, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a high energy laser (HEL) configured to transmit a HEL beam aimed at a first location on an airborne target;
   a beacon illuminator (BIL) configured to transmit a BIL beam aimed at a second location on the target, wherein the second location is offset from the first location;
   at least one fast steering mirror (FSM) configured to steer the BIL beam to be spatially and angularly offset from the HEL beam; and
   at least one Coudé path FSM configured to simultaneously receive both the HEL beam and the BIL beam and steer the HEL beam and the BIL beam to correct for atmospheric jitter of the HEL beam and the BIL beam while maintaining the offset of the BIL beam from the HEL beam.

2. The system of claim 1, wherein the at least one Coudé path FSM is configured to receive the HEL beam and the BIL beam after the at least one FSM steers the BIL beam.

3. The system of claim 1, further comprising:
   a camera configured to receive reflected energy of the BIL beam and the HEL beam reflected off the target.

4. The system of claim 3, further comprising:
   at least one controller configured to:
      process the reflected energy received by the camera to generate images;
      estimate the atmospheric jitter based on the images;
      control movement of the at least one FSM to adjust the offset of the BIL beam from the HEL beam; and
      control movement of the at least one Coudé path FSM to correct for the atmospheric jitter.

5. The system of claim 4, wherein the at least one controller is configured to control the movement of the at least one Coudé path FSM based on a difference between uplink jitter and downlink jitter.

6. The system of claim 3, further comprising an aperture sharing element configured to receive and reflect the HEL beam and the BIL beam while allowing a return spot of the BIL beam reflected off the target to pass through to the camera.

7. The system of claim 6, further comprising a high speed mirror configured to stabilize the return spot of the BIL beam reflected off the target before being received at the camera.

8. The system of claim 3, wherein the camera is a high-speed short wave infrared (SWIR) camera co-boresighted with the HEL.

9. The system of claim 1, further comprising a deformable mirror configured to receive both the HEL beam and the BIL beam and change a shape of a surface to correct for atmospheric wavefront errors.

10. A jitter correction system comprising:
    at least one fast steering mirror (FSM) configured to receive a beacon illuminator (BIL) beam transmitted by a BIL and steer the BIL beam to be spatially and angularly offset from a high energy laser (HEL) beam transmitted by a HEL, wherein the HEL beam is aimed a first location on an airborne target, the BIL beam is aimed at a second location on the target, and the second location is offset from the first location; and
    at least one Coudé path FSM configured to simultaneously receive both the HEL beam and the BIL beam and steer the HEL beam and the BIL beam to correct for atmospheric jitter of the HEL beam and the BIL beam while maintaining the offset of the BIL beam from the HEL beam.

11. The jitter correction system of claim 10, wherein the at least one Coudé path FSM is configured to receive the HEL beam and the BIL beam after the at least one FSM steers the BIL beam.

12. The jitter correction system of claim 11, further comprising:
    a camera configured to receive reflected energy of the BIL beam and the HEL beam reflected off the target.

13. The jitter correction system of claim 12, further comprising:
    at least one controller configured to:
       process the reflected energy received by the camera to generate images;
       estimate the atmospheric jitter based on the images;
       control movement of the at least one FSM to adjust the offset of the BIL beam from the HEL beam; and
       control movement of the at least one Coudé path FSM to correct for the atmospheric jitter.

14. The jitter correction system of claim 13, wherein the at least one controller is configured to control the movement of the at least one Coudé path FSM based on a difference between uplink jitter and downlink jitter.

15. The jitter correction system of claim 12, further comprising an aperture sharing element configured to receive and reflect the HEL beam and the BIL beam while allowing a return spot of the BIL beam reflected off the target to pass through to the camera.

16. The jitter correction system of claim 15, further comprising a high speed mirror configured to stabilize the return spot of the BIL beam reflected off the target before being received at the camera.

17. The jitter correction system of claim 12, wherein the camera is a high-speed short wave infrared (SWIR) camera co-boresighted with the HEL.

18. The jitter correction system of claim 10, further comprising a deformable mirror configured to receive both the HEL beam and the BIL beam and change a shape of a surface to correct for atmospheric wavefront errors.

19. A method comprising:
    transmitting, by a high energy laser (HEL), a HEL beam aimed at a first location on an airborne target;
    transmitting, by a beacon illuminator (BIL), a BIL beam aimed at a second location on the target, wherein the second location is offset from the first location;

steering, by at least one fast steering mirror (FSM), the BIL beam to be spatially and angularly offset from the HEL beam; and simultaneously receiving, by at least one Coudé path FSM, both the HEL beam and the BIL beam and steering the HEL beam and the BIL beam to correct for atmospheric jitter of the HEL beam and the BIL beam while maintaining the offset of the BIL beam from the HEL beam.

20. The method of claim 19, wherein the at least one Coudé path FSM receives the HEL beam and the BIL beam after the at least one FSM steers the BIL beam.

21. The method of claim 19, further comprising:

receiving, at a camera, reflected energy of the BIL beam and the HEL beam reflected off the target;

processing, by at least one controller, the reflected energy to generate images;

estimating, by the at least one controller, the atmospheric jitter based on the images;

controlling, by the at least one controller, movement of the at least one FSM to adjust the offset of the BIL beam from the HEL beam; and controlling, by the at least one controller, movement of the at least one Coudé path FSM to correct for the atmospheric jitter.

22. The method of claim 21, further comprising:

receiving, at an aperture sharing element, the HEL beam and the BIL beam and reflecting the HEL beam and the BIL beam while allowing a return spot of the BIL beam reflected off the target to pass through to the camera.

* * * * *